(12) United States Patent
Deguchi et al.

(10) Patent No.: US 8,009,390 B2
(45) Date of Patent: Aug. 30, 2011

(54) HEAD GIMBAL ASSEMBLY WITH RECESSED PORTION AND MANUFACTURING METHOD THEREOF

(75) Inventors: Takaaki Deguchi, Kanagawa (JP); Mutsuro Ohta, Kanagawa (JP); Shinichi Kimura, Kanagawa (JP); Hiroshi Matsuda, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 1126 days.

(21) Appl. No.: 11/809,060

(22) Filed: May 30, 2007

(65) Prior Publication Data
US 2007/0297093 A1  Dec. 27, 2007

(30) Foreign Application Priority Data
May 30, 2006 (JP) .................. 2006-149415

(51) Int. Cl.
*G11B 5/48* (2006.01)
(52) U.S. Cl. ............................ 360/245.7
(58) Field of Classification Search ............ None
See application file for complete search history.

(56) References Cited

U.S. PATENT DOCUMENTS

| 4,724,500 A * | 2/1988 | Dalziel ........................ 360/245.7 |
| 5,243,482 A * | 9/1993 | Yamaguchi et al. ....... 360/245.4 |
| 5,682,279 A * | 10/1997 | Imasaki ........................ 360/245 |
| 6,538,850 B1 * | 3/2003 | Hadian et al. .............. 360/245.7 |
| 6,646,832 B2 | 11/2003 | Anaya-Dufresne et al. |
| 2003/0007291 A1 * | 1/2003 | Kasajima et al. .......... 360/245.4 |
| 2005/0157428 A1 * | 7/2005 | Choi ........................... 360/245.7 |

FOREIGN PATENT DOCUMENTS

| JP | 63-58372 U | 4/1988 |
| JP | 10-064212 | 3/1998 |
| JP | 2005-190511 | 7/2005 |

* cited by examiner

*Primary Examiner* — David D Davis
(74) *Attorney, Agent, or Firm* — Mahamedi Paradice Kreisman LLP; Christopher J. Brokaw (57) ABSTRACT

Embodiments in accordance with the present invention reduce the height of a head gimbal assembly (HGA) while maintaining the rigidity of a load beam. According to one embodiment of the present invention, an HGA includes a slider, a flexure, and a load beam. The load beam includes a flange formed to protrude to the opposite side to a magnetic disk at the edge of the load beam extending in the length-wise direction. The load beam has a recessed portion opened to the side opposing the magnetic disk and having an opening area larger than the area of the back surface of the slider opposing the flexure. The slider is provided in the recessed portion so that the position of the surface of the load beam is between a virtual surface including the surface of the slider opposing the magnetic disk and a virtual surface including the slider back surface.

9 Claims, 6 Drawing Sheets

HEAD GIMBAL ASSEMBLY WITH RECESSED PORTION AND MANUFACTURING METHOD THEREOF

CROSS-REFERENCE TO RELATED APPLICATION

The instant nonprovisional patent application claims priority to Japanese Application No. 2006-149415 filed May 30, 2006 and incorporated by reference in its entirety herein for all purposes.

BACKGROUND OF THE INVENTION

A magnetic disk drive includes a magnetic disk that records data, and a head slider that accesses the magnetic disk. The head slider has a head element that reads/writes data from/to the magnetic disk. The head element includes a recording element that converts an electrical signal into a magnetic field in response to recording data to the magnetic disk and a reproducing element that converts a magnetic field from the magnetic disk into an electrical signal.

The magnetic disk drive includes a carriage that moves the head slider to a desired position on the magnetic disk. The carriage is driven by a voice coil motor (VCM) and pivots around a pivotal shaft to move the head slider in the radial direction of the magnetic disk on the rotating magnetic disk. In this way, the head element accesses a desired track formed on the magnetic disk, so that data can be read/written therefrom/thereto.

The carriage includes an elastic suspension and the head slider is fixed to the suspension. The pressure caused by the air viscosity between the air bearing surface (ABS) of the head slider opposing the magnetic disk and the rotating magnetic disk balances with pressure applied in the direction of the magnetic disk by the suspension, so that the head slider can fly over the magnetic disk at a prescribed gap therebetween. The member made of the head slider and the suspension that supports the slider is called "head gimbal assembly" (HGA).

Figure 6:
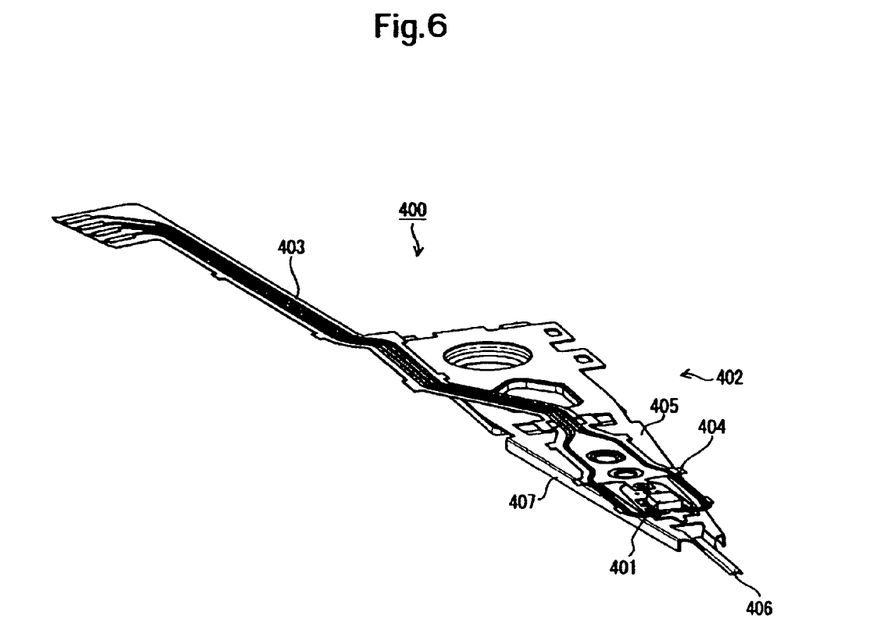
FIG. 6 is a view of the structure of a conventional HGA.

FIG. 6 is a view of a conventional HGA showing the structure of the HGA viewed from the side of the recording plane of the magnetic disk. As shown in FIG. 6, the HGA 400 includes a head slider 401, a suspension 402, and a lead 403. The lead 403 is a conductive wiring used to transmit a recording signal between the head element (not shown) formed at the head slider 401 and an amplifier portion (not shown) and/or a reproducing signal from the head element.

The suspension 402 includes a flexible flexure 404 that holds the head slider 401 on the side of the surface opposing the magnetic disk and a load beam 405 that holds the flexure 404 on the side of the surface opposing the magnetic disk. The shown HGA 400 is a load/unload type device and has a tab 406 at the tip end of the load beam 405 used to withdraw the device into a ramp mechanism.

The load beam is made of for example a layered material of a three-layer structure including stainless steel plates or two stainless steel plates and a polyimide resin layer provided therebetween (see for example Japanese Patent Publication No. 2005-190511 "Patent Document 1"). An edge part is bent in the length-wise direction of the load beam so that necessary rigidity is secured. The bent edge part of the load beam will hereinafter be called flange. The load beam 405 shown in FIG. 6 has a flange 407.

Figure 7:
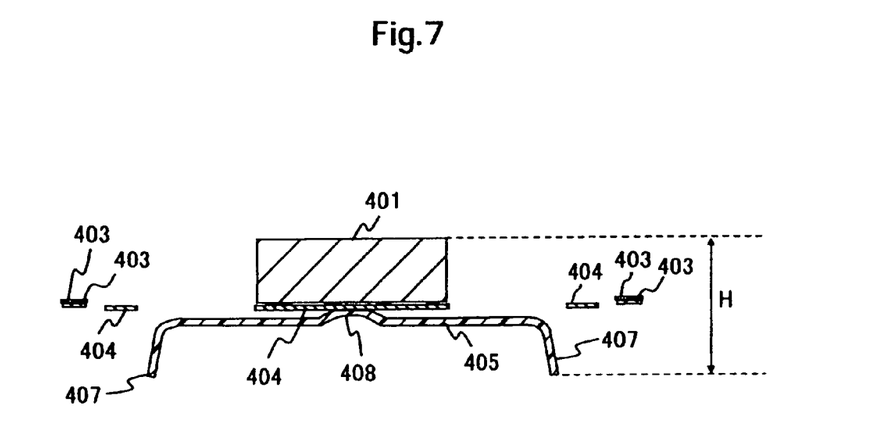
FIG. 7 is a view of the structure of the conventional HGA.

FIG. 7 is a sectional view of the HGA 400. The section in FIG. 7 is taken along the center of the slider 401 and in the width-wise direction of the HGA 400. A dimple 408 raised toward the side of the flexure 404 (upwardly in the figure) is formed in a position of the load beam 405 opposing the head slider 401. The flexure 404 bears on the load beam 405 as it is pressed against the dimple 408 by its own elasticity.

As shown in FIG. 7, the height H of the HGA 400 is determined based on the height of the head slider 401, the height of the flexure 404, and the height of the load beam 405. The height of the load beam 405 is determined based on the height of the dimple 408, the thickness of the thin plate that forms the load beam 405, and the height of the flange 407. Here, the height H of the HGA 400 refers to the thickness of the HGA in the orthogonal direction to the recording plane of the magnetic disk.

In recent years, with the advent of thinner magnetic disk drives, there has been a demand for HGAs having smaller heights. In order to reduce the height of the HGA 400 as shown in FIGS. 6 and 7, the height of the load beam 405 may be reduced. However, if the height of the flange 407 is reduced to reduce the height of the load beam 405, the rigidity (flexural and torsional rigidity) of the load beam 405 could be reduced, and necessary rigidity cannot be secured. Therefore, the extent of how much the height of the flange 407 can be reduced is limited in consideration of the rigidity of the load beam 405 that should be secured.

Note that an HGA disclosed by Japanese Laid-Open Utility Model No. 63-58372 ("Patent Document 2") has its height reduced by bending the flange at the edge of the load beam in the opposite direction to the flange 407 in FIG. 7, in other words, it is bent to the side on which the slider is fixed. However, if such a structure is employed, it would be difficult to provide the flange around the slider in order to prevent the interference between the flange provided at the edge of the load beam and the slider or between the flange and the flexure or the lead provided around the slider. Therefore, the load beam could not have sufficient rigidity.

BRIEF SUMMARY OF THE INVENTION

Figure 3A:
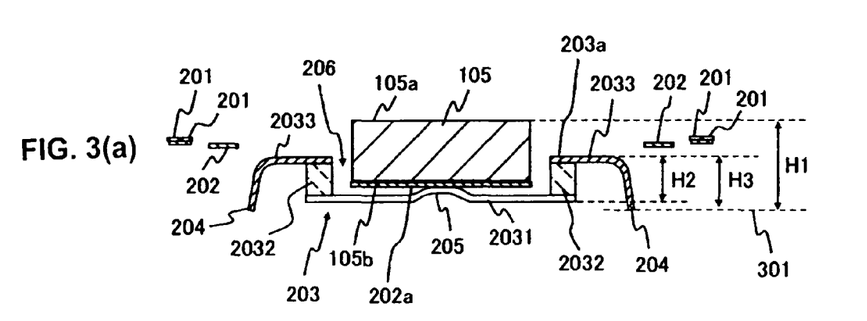
FIGS. 3(a)-3(b) are exemplary sectional views of the HGA according to an embodiment of the present invention.
Figure 3B:
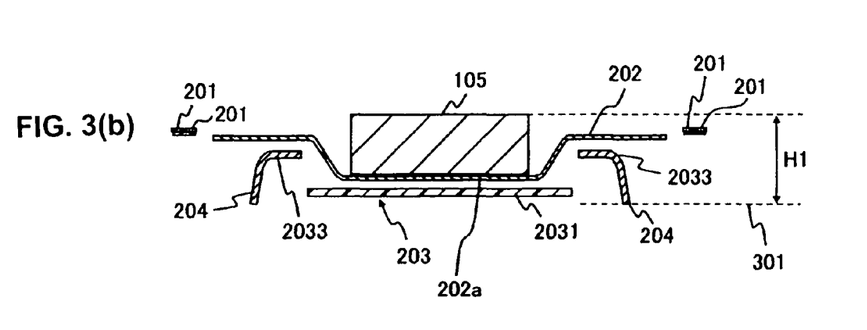

Embodiments in accordance with the present invention is reduce the height of a head gimbal assembly (HGA) while maintaining the rigidity of a load beam. According to the embodiment of FIG. 3, an HGA 200 includes a slider 105, a flexure 202, and a load beam 203. The load beam 203 includes a flange 204 formed to protrude to the opposite side to a magnetic disk at the edge of the load beam extending in the length-wise direction. The load beam 203 has a recessed portion 206 opened to the side opposing the magnetic disk and having an opening area larger than the area of the back surface 105b of the slider 105 opposing the flexure 202. The slider 105 is provided in the recessed portion 206 so that the position of the surface 203a of the load beam 203 is between a virtual surface including the surface of the slider 105 opposing the magnetic disk and a virtual surface including the slider back surface 105b.

DETAILED DESCRIPTION OF THE INVENTION

Embodiments in accordance with the present invention relate to a head gimbal assembly (HGA) including a head slider and a suspension that supports the head slider. Embodiments of the present invention provide an HGA that may have its height reduced while the rigidity of the load beam is maintained.

An HGA according to embodiments of the present invention includes a head slider having a head element that carries out at least one of reading and writing data from/to a magnetic disk, a flexure that holds the head slider, and a load beam to which the flexure is fixed. The load beam includes a flange formed to protrude on the side opposite to the surface of the load beam on the side opposing the magnetic disk at an edge of the load beam extending in the length-wise direction, and a recessed portion provided to open to the side opposing the magnetic disk and having an opening area greater than the area of a first surface of the head slider opposing the flexure. The head slider is positioned in the recessed portion so that the position of the surface of the load beam on the side opposing the magnetic disk is between a virtual surface including a surface of the head slider opposing the magnetic disk and a virtual surface including the first surface.

In this way, in the HGA according to embodiments of the present invention, the head slider is provided offset from the magnetic disk in the recessed portion provided at the load beam. Furthermore, the flange is formed to protrude in the direction away from the magnetic disk. Therefore, the height of the head slider is cancelled by the height of the flange for the amount of offset of the head slider relative to the magnetic disk. In this way, the height of the HGA may be lowered at least for the offset amount of the height of the head slider. The height of the HGA may be reduced without reducing the height of the flange, and therefore the rigidity of the load beam is not reduced.

Furthermore, in the HGA according to embodiments of the present invention, the position of the first surface viewed from the magnetic disk side is desirably between the surface of the load beam on the side opposing the magnetic disk and a virtual surface including a tip end of the flange.

In the HGA according to embodiments of the present invention, desirably, the load beam is formed of a layered material having first and second plate materials and an intermediate layer therebetween, the first plate material forms the substrate of the load beam, the intermediate layer forms the sidewall of the recessed portion, and the second plate material forms the bottom of the recessed portion.

Note that the intermediate layer is desirably formed of a resin material. The resin material functions as a damper material, and therefore the damping effect may be expected.

Furthermore, the first plate material and the second plate material may be stainless steel, and the intermediate layer may be polyimide resin.

Meanwhile, a method of manufacturing an HGA according to embodiments of the present invention includes the following steps. A layered material having first and second plate materials and an intermediate layer therebetween is prepared. Then, the first plate material and the intermediate layer are etched from the side of the first plate material, so that a recessed portion having the second plate material serving as a bottom and the intermediate layer serving as a sidewall is formed. Then, the second plate material and the intermediate layer are etched at least excluding a region forming the bottom of the recessed portion in the second plate material from the side of the second plate material, so that the substrate of the load beam is formed by the first plate material. An edge portion of the substrate is bent to the side of the intermediate layer to form a flange. Finally, the flexure and the head slider are provided so that the head slider is positioned in the recessed portion.

By the manufacturing method, an HGA that allows its height to be reduced while the rigidity of the load beam is maintained may readily be provided. The etching is employed, so that the expansion in the width of the load beam as occurring by the press-working may be prevented.

As described above, according to embodiments of the present invention, the total height of the HGA may be reduced without changing the height of the flange portion of the load beam. In this way, the height of the HGA may be reduced, and the rigidity of the load beam may be maintained at the same time.

In the following, a specific embodiment of the present invention will be described in detail in conjunction with the accompanying drawings. Note that in the drawings, the same elements are denoted by the same reference characters and the description will not be repeated as the case may be for clarification of the description. The following embodiment is an application of the invention to a load/unload type magnetic disk drive.

First Embodiment of the Invention

Figure 1:
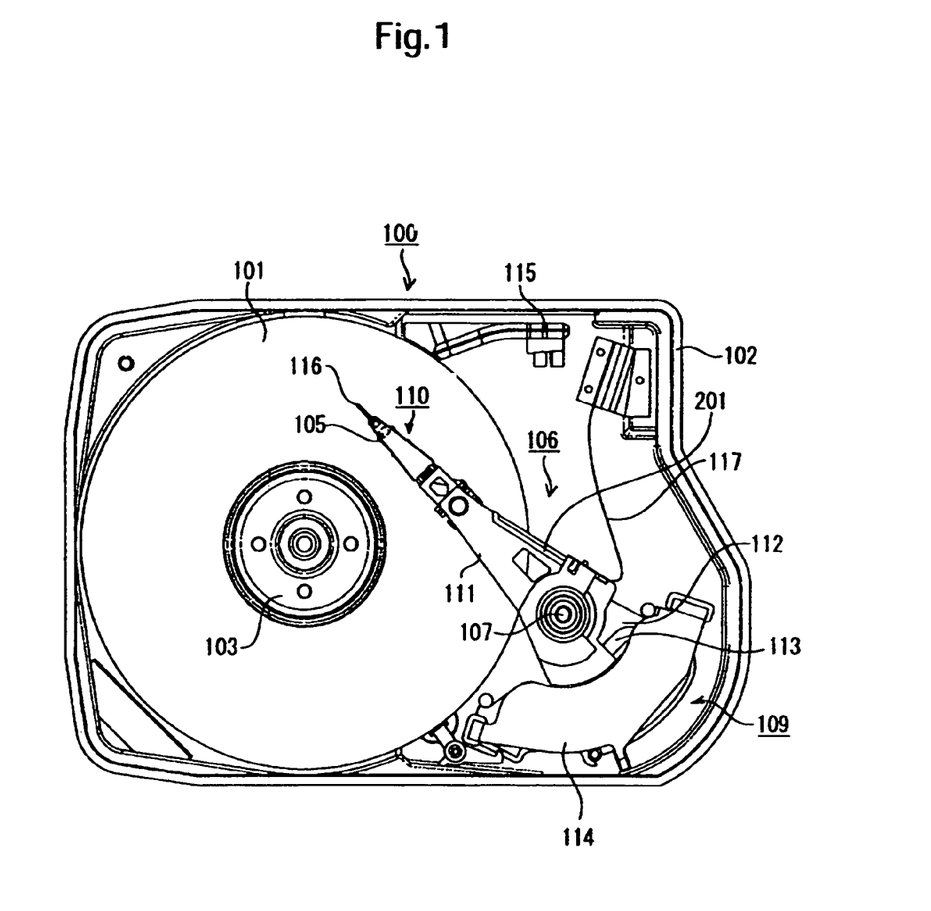
FIG. 1 is an exemplary view of the structure of a magnetic disk drive according to an embodiment of the present invention.

To start with, for easier understanding of the invention, the general structure of the magnetic disk drive will be described. FIG. 1 is an exemplary schematic plan view of the structure of the magnetic disk drive 100 according to the embodiment. The magnetic disk drive 100 includes a magnetic disk 101 as a recording medium used to record data. The magnetic disk 101 is a non-volatile memory that has its magnetic layer magnetized and records data accordingly. The respective constitutional elements of the magnetic disk drive 100 are stored in a base 102. The base 102 is fixed through a cover (not shown) covering the upper opening of the base 102 and a gasket (not shown) to form a disk enclosure, so that the respective constitutional elements of the magnetic disk drive 100 may be stored in a sealed state.

The magnetic disk 101 is fixed to a spindle motor (SPM) 103. The head slider 105 includes a head element that writes/reads data to/from the magnetic disk 101 as for the data input/output to/from the host (not shown). The head element has a write element that converts an electrical signal into a magnetic field in response to storage data to the magnetic disk 101 and/or a reproducing element that converts a magnetic field from the magnetic disk 101 into an electrical signal.

The carriage 106 holds and moves the head slider 105. The carriage 106 is pivotably supported around the pivotal shaft 107 and driven by a VCM (voice coil motor) 109 as a driving mechanism. The carriage 106 includes a suspension 110, an arm 111, a coil support 112, and a flat coil 113 from the tip end in the lengthwise-direction in which the head slider 105 is provided and these elements are coupled in the mentioned order. Note that the structure of the suspension 110 will be described later. The VCM 109 includes the flat coil 113, a stator magnet (not shown) fixed to an upper side stator magnet holding plate 114, and a stator magnet (not shown) fixed to a lower side stator magnet holding plate.

The carriage 106 moves the head slider 105 over the data region in the surface of the rotating magnetic disk 101 to allow data to be read/written from/to the magnetic disk 101. The pivotal movement of the carriage 106 moves the head slider 105 in the radial direction of the surface of the magnetic disk 101. In this way, the head slider 105 may access a desired track on the magnetic disk 101.

A signal between the head slider 105 and a controller (not shown) is transferred through a lead 201 as a conductive wiring and a flexible printed circuit board (FPC) 117. The pressure caused by the air viscosity between the air bearing surface (ABS) of the head slider 105 opposing the magnetic disk 101 and the magnetic disk 101 balances with force applied in the direction of the magnetic disk 101 by the suspension 110, so that the head slider 105 may fly over the magnetic disk 101 at a prescribed gap therebetween.

When the rotation of the magnetic disk 101 stops, the carriage 106 withdraws the head 105 from the data region to a ramp mechanism 115. The carriage 106 pivots in the direction of the ramp mechanism 115, the tab 116 provided at the tip end of the carriage 106 slides on the surface of the ramp mechanism 115 and lands on a parking surface on the ramp mechanism 115, so that the head slider 105 is unloaded. When the head is loaded, the head slider 105 that has been supported on the parking surface is departed from the ramp mechanism 115 and moves to above the magnetic disk 101.

Figure 2:
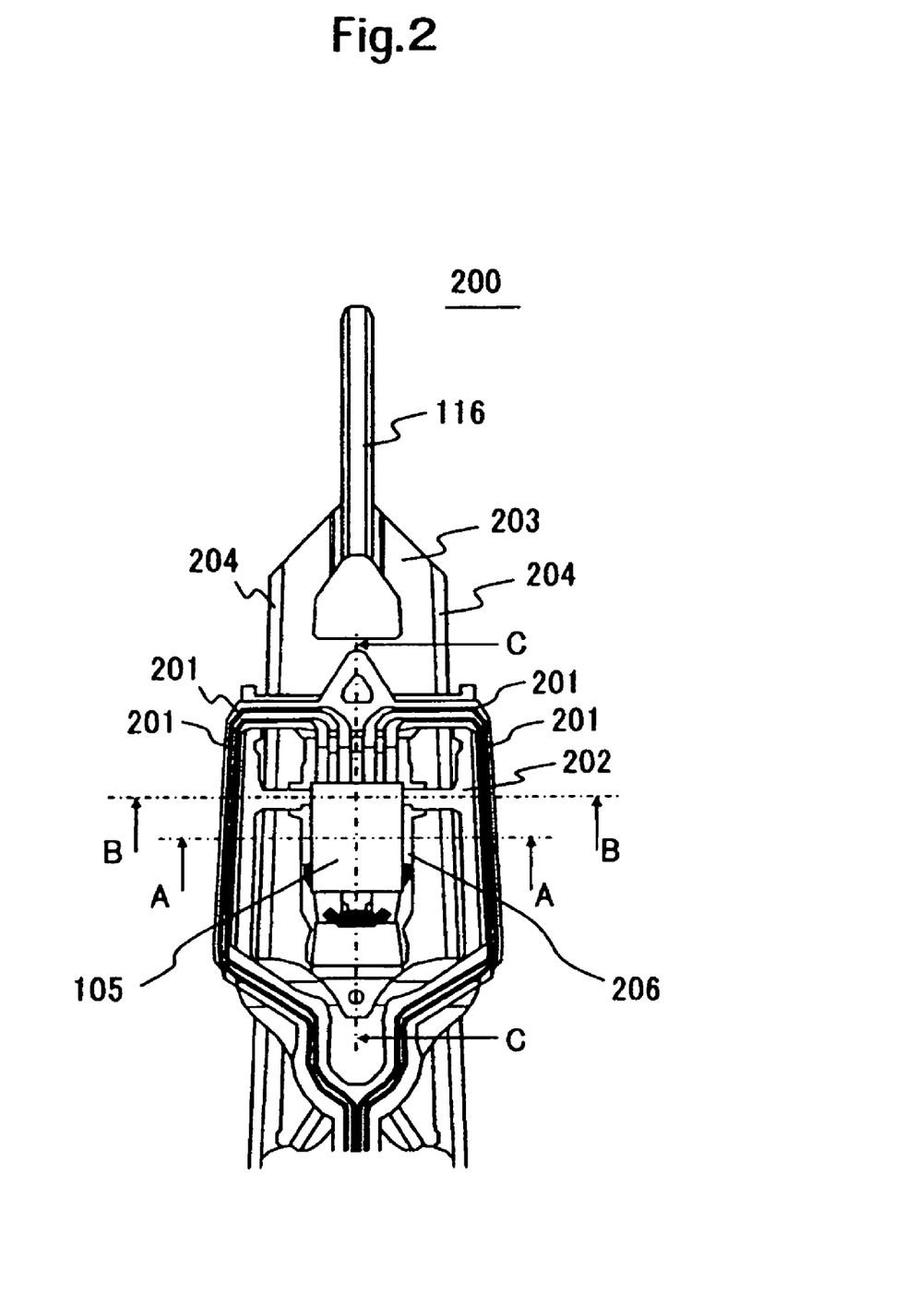
FIG. 2 is an exemplary view of the structure of an HGA according to an embodiment of the present invention.

Now, an HGA 200 according to an embodiment will be described. FIG. 2 is an exemplary plan view of an essential structure of the HGA 200, viewed from the side of the magnetic disk 101. The HGA 200 includes a plurality of elements, a head slider 105, a flexure 202, a load beam 203, and a lead 201. Note that the part excluded from FIG. 2 has the same structure as that of the conventional HGA 400 shown in FIG. 6 and therefore a detailed description of the part is not provided.

The lead 201 is a conductive wiring used to transmit a recording signal and a reproduction signal between a head element (not shown) formed at the head slider 105 and an amplifier portion (not shown) included in the magnetic disk drive 100. The flexible flexure 202 is fixed to the load beam 203 on the side of the magnetic disk 101. The flexure 202 holds the head slider 105. The assembly made of the load beam 203, the flexure 202, and the lead 201 is the suspension 110 shown in FIG. 1.

The tab 116 is formed at the tip end of the load beam 203, and a flange 204 is formed at the edge part. The flange 204 is formed by bending the edge part of the load beam 203 to the opposite side to the magnetic disk 101, in other words, in the lengthwise direction as shown in FIG. 2. The load beam 203 has a recessed portion 206 dented in the direction away from the recording plane of the magnetic disk 101, in other words, in the length-wise direction as shown in FIG. 2 and provided to surround the slider 105. In the following, the characteristic shape of the load beam 203 according to the embodiment will be described in detail in conjunction with FIGS. 3 and 4.

Figure 4:
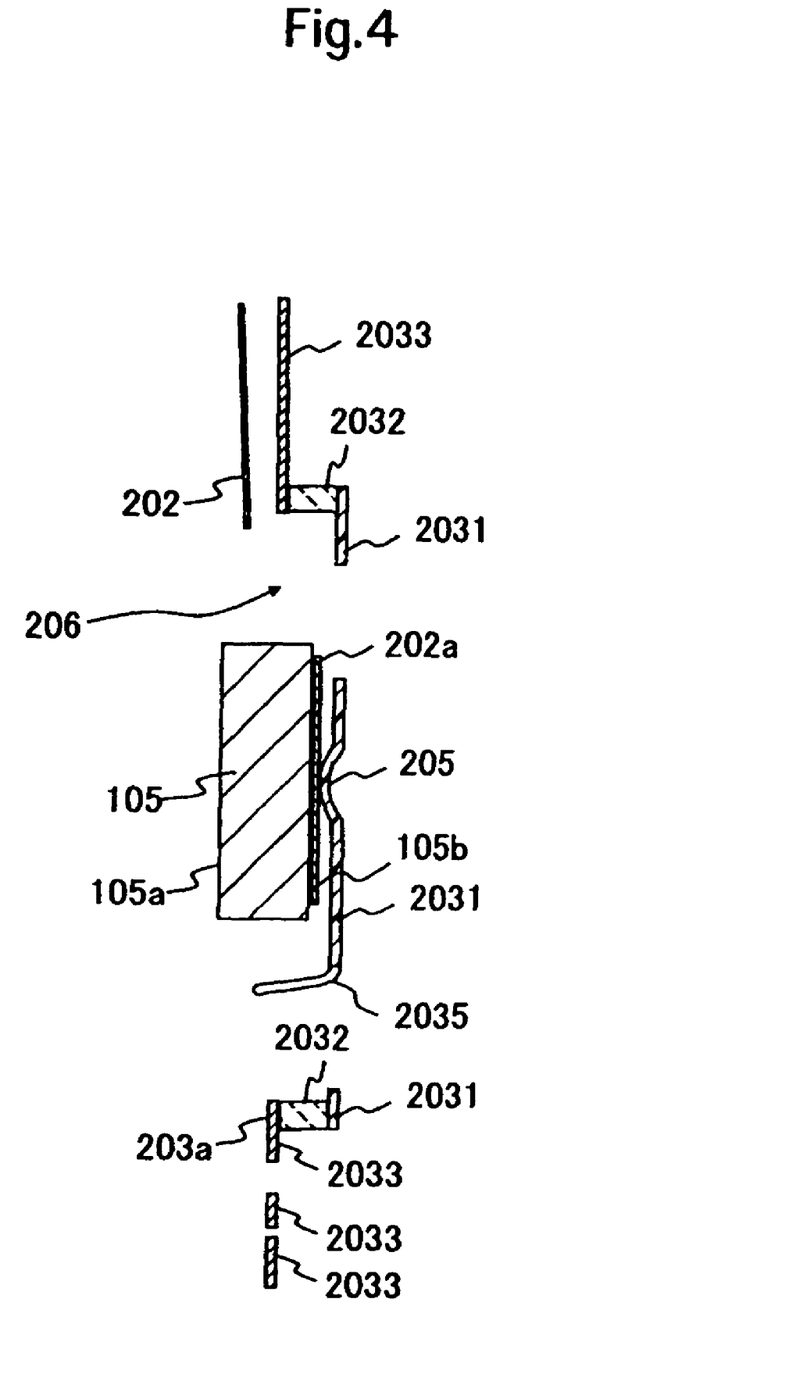
FIG. 4 is an exemplary sectional view of the HGA according to an embodiment of the present invention.

FIG. 3(a) is an exemplary sectional view of the HGA 200 taken along line A-A in FIG. 2, FIG. 3(b) is an exemplary sectional view of the HGA 200 taken along line B-B in FIG. 2, and FIG. 4 is an exemplary sectional view of the HGA 200 taken along line C-C in FIG. 2. As shown in FIGS. 3(a) and 4, the load beam 203 has the recessed portion 206 dented in the direction away from the recording plane of the magnetic disk 101 (downward in the figures). More specifically, the recessed portion 206 and the flange 204 are formed to protrude in the direction away from the recording plane of the magnetic disk 101.

The magnetic disk 101 is positioned in the upper part in FIGS. 3(a) and 3(b) and in the left part in FIG. 4. The reference numeral 205 in FIGS. 3(a) and 4 represents a dimple that supports the flexure 202. The reference numeral 202a in FIGS. 3 and 4 refers to a stage that is a region in which the head slider 105 is provided in the flexure 202.

The head slider 105 is provided in a state offset from the magnetic disk 101 as if it is embedded in the recessed portion 206 provided in the load beam 203. More specifically, the surface (slider back surface 105b) of the head slider 105 on the opposite side to the ABS 105a and fixed to the state 202a is provided offset in the direction away from the magnetic disk 101 at least more than the surface 203a of the load beam 203 on the side of the magnetic disk 101. Stated differently, the head slider 105 is provided so that the head slider back surface 105b is positioned between the load beam surface 203a and a virtual surface 301 including the tip end of the flange 204.

As described above, the HGA 200 according to the embodiment has the recessed portion 206 in the load beam 203, and the head slider 105 is provided in the portion offset from the magnetic disk 101. The recessed portion 206 and the flange 204 are both formed to protrude in the direction away from the recording plane of the magnetic disk 101. Therefore, the height H2 of the recessed portion 206 is cancelled by the height H3 of the flange 204, and the height of the HGA 200 is not increased by the recessed portion 206.

As in the foregoing, the HGA 200 according to the embodiment may have its height H1 made smaller than the height H of the conventional HGA 400 shown in FIG. 7 by the total of the height of the offset head slider 105 and the thickness of the flexure 202. The height of the HGA 200 may be lowered without lowering the height of the flange 204, and therefore the rigidity of the load beam 203 is not lowered.

As shown in FIG. 3(a), the height H2 of the recessed portion 206 may be equal to or smaller than the height H3 of the flange 204. Whether the height H2 of the recessed portion 206 exceeds the height H3 of the flange 204 or H2 equals H3, the total height H1 of the HGA 200 is substantially the same, and therefore the height H2 larger than H3 does not contribute to reduction of the height of the HGA 200.

Now, the material of the load beam 203 according to the embodiment and a manufacturing method thereof will be described. The load beam 203 is formed of a layered material produced by providing two stainless steel plates and a polyimide resin layer therebetween. The reference numerals 2031 and 2033 shown in FIGS. 3(a), 3(b) and 4 refer to the stainless steel plates, and the reference numeral 2032 refers to the polyimide resin layer.

More specifically, the sidewall of the recessed portion 206 is formed by the polyimide resin layer 2032 and the bottom of the recessed portion 206 is formed by the stainless steel plate 2031. In this way, in the load beam 203, the two stainless steel plates 2031 and 2033 are separated by the polyimide resin layer 2032. The depth of the recessed portion 206 may be adjusted by the thickness of the polyimide resin layer 2032.

Note that the sidewall of the recessed portion 206 formed by the polyimide resin layer 2032 does not have to be provided in each of the four directions and may partly be provided as in the sectional views in FIGS. 3 and 4. The bottom of the recessed portion 206 formed by the stainless steel plate 2031 may be provided with a hole as an opening as shown in the sectional view in FIG. 4. A projection 2035 on the side of the pivotal shaft 107 of the slider 105 forms a part of the slider limiter. When the slider 105 moves away from the dimple 205, the projection 2035 on the side of the load beam 203 is caught on the flexure 202, and prevents the departure.

Figure 5A:
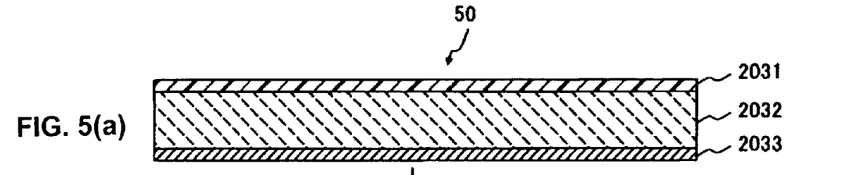
FIGS. 5(a)-5(b) are exemplary views for use in illustrating the steps of manufacturing a load beam according to an embodiment of the present invention.

The steps of manufacturing the load beam 203 will be described in conjunction with FIG. 5. FIG. 5(a) shows the exemplary state of the layered material 50 including the three layers, the stainless steel layer 2031, the polyimide layer 2032, and the stainless steel layer 2033 before the processing. In a first step, the metal layers of stainless steel 2031 and 2033 are processed by photo-etching. More specifically, resist films in shapes suitable for shapes desired to be obtained by processing are formed on the surfaces of the stainless steel 2031 and 2033, then the stainless steel layers 2031 and 2033 are etched by a known wet or dry etching technique, and then the resist films are removed.

Figure 5B:
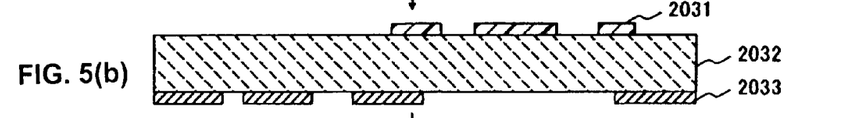

FIG. 5(b) shows the exemplary state of the layered material 50 after carrying out the first step described above. Note that at the time of processing the stainless steel layers 2031 and 2033, the layered material 50 must be etched from both sides. Therefore, if etching in both directions cannot be carried out at the same time, the stainless steel layers 2031 and 2033 may sequentially be etched.

Figure 5C:
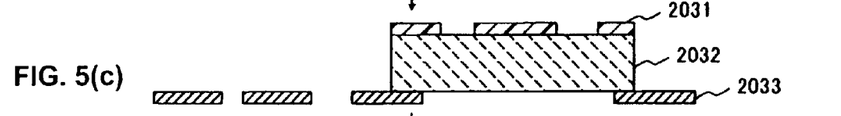
Figure 5D:
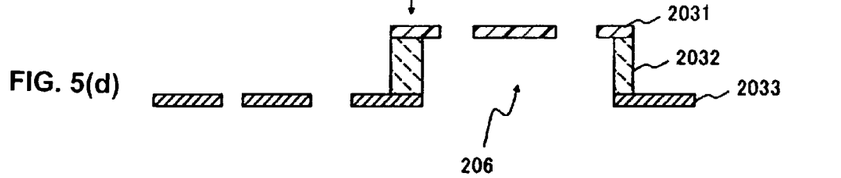

Both in second and third steps, the polyimide resin 2033 is processed. In the second step, the polyimide resin 2032 is etched and removed from above in the figure by a known wet or dry etching technique (FIG. 5(c)), and in the third step the polyimide resin 2032 is etched and removed from below in the figure. FIG. 5(d) shows the exemplary state of the layered material 50 after carrying out the first to third steps, and the recessed portion 206 is formed.

As described above, the layered material is processed by the etching techniques, so that the recessed portion 206 may be formed without carrying out press-working. The above-described manufacturing steps are simply an example, and the order of carrying out the steps is not limited to the described order.

Note that one thin plate such as a stainless steel plate could be subjected to press-working and the load beam having the recessed portion 206 used to offset the head slider 105 could be formed. In order to form the recessed portion 206 by press-working, the load beam must be bent in two or more locations in the width-wise direction of the load beam. The location subjected to the bending processing needs a prescribed bending curvature. Therefore, the load beam having the recessed portion 206 formed by the press working has a large width. The increase in the width of the load beam is undesirable because it restricts the layout in the magnetic disk drive and increases the weight of the HGA.

In contrast, the load beam 203 according to the embodiment is provided with the recessed portion 206 by etching both surfaces of the layered material of the three-layer structure. Therefore, without the expansion in the width of the load beam occurring by the press-working, the load beam may have a smaller width than the case of forming it by the press-working.

The use of the layered material having the polyimide resin layer in-between allows the polyimide resin to serve as a damper member, so that a damping effect may be expected. Note that another resin material may be used instead of the polyimide resin as the intermediate layer of the layered material that forms the load beam 203.

Note that embodiments in accordance with the present invention may be applied to a CSS (contact start and stop) type magnetic disk drive in which the head slider 105 retreats into a zone provided at the inner circumference of the magnetic disk 101 when data writing/reading is not carried out. In the above described magnetic disk drive, the magnetic disk 101 is a single one-sided recording disk for the purpose of simplification, while the magnetic disk drive 100 may have one or more double-sided recording magnetic disks.

Other Embodiments

The HGA 200 according to the first embodiment of the invention is provided with the recessed portion 206 only in the region opposing the head slider 105 of the load beam 203. However, it is only necessary that the opening area of the recessed portion 206 be larger than the area of the back surface 105b of the head slider 105, so that the head slider 105 may be offset from the magnetic disk 101.

Therefore, the recessed portion 206 may have a larger opening area, and for example the recessed portion 206 may be formed for the entire load beam 203 including the position opposing the head slider 105 in the length-wise direction of the load beam 203. At the time, the load beam 203 may be recessed to its ends in the length-wise direction, so that the sidewall of the recessed portion 206 may have an opened shape.

The load beam 203 according to the first embodiment of the invention is formed of the layered material including the stainless steel plates and the polyimide resin, while other kinds of metal plates may be used instead of the stainless steel plate, and other substitute materials may be used as long as the conditions such as the weight, rigidity, and contamination may be satisfied. Other materials may be used instead of the polyimide resin.

The material of the load beam 203 is not limited to the layered material described in connection with the first embodiment of the invention. The method of manufacturing the load beam 203 is not limited to the manufacture by etching. For example, the load beam 203 having the recessed portion 206 may be formed by press-working to a single metal plate. A half-etching technique to control the depth of etching may be applied so that the load beam 203 having the recessed portion 206 may be formed from a single stainless steel plate.

The number of layers included in the layered material to form the load beam 203 according to the first embodiment of the invention is not limited to three. The number of the layers may be greater. It is understood that the present invention is not limited to the above-described embodiment and various modifications may be carried out without departing from the scope of the present invention.

What is claimed is:

1. A head gimbal assembly comprising:
  a head slider having a head element for reading and/or writing data from/to a magnetic disk;
  a flexure for holding the head slider; and
  a load beam to which the flexure is fixed, and including a flange formed to protrude on the side opposite to the surface of the load beam on the side opposing the magnetic disk at an edge of the load beam extending in the longitudinal direction, and a recessed portion provided to open to the side opposing the magnetic disk and having an opening area greater than the area of a first surface of the head slider opposing the flexure, wherein the position of the surface of the load beam on the side opposing the magnetic disk being between a virtual surface including a surface of the head slider opposing the magnetic disk and a virtual surface including the first surface, the head slider being positioned in the recessed portion, and
  wherein the load beam has a structure comprising a layered material having an intermediate layer between a first plate and a second plate, the first plate forms the substrate of the load beam, the intermediate layer forms the sidewall of the recessed portion, and the second plate forms the bottom of the recessed portion.

2. The head gimbal assembly according to claim 1, wherein the position of the first surface is between the surface of the load beam on the side opposing the magnetic disk and a virtual surface including a tip end of the flange.

3. The head gimbal assembly according to claim 1, wherein the recessed portion includes a bottom, the bottom has a dimple raised to the side on which the head slider is positioned, and the flexure is supported in contact with the dimple.

4. The head gimbal assembly according to claim 1, wherein the intermediate layer is formed of a resin.

5. The head gimbal assembly according to claim 1, wherein the first plate and the second plate are stainless steel, and the intermediate layer is polyimide resin.

6. A suspension for holding a head slider having a head element, comprising:
   a flexure having a stage at which the head slider is positioned; and
   a load beam at which the flexure is fixed including a flange formed to protrude to the side opposite to the surface of the load beam on the side on which the flexure is provided at both edges of the load beam extending in the length-wise direction of the load beam, and a recessed portion provided to open to the side on which the flexure is provided, wherein
   the flexure being provided in the recessed portion so that the position of a virtual surface including the stage is between a virtual surface including an end of the flange and a virtual surface including the surface of the load beam on the side on which the flexure is provided, and
   wherein the load beam has a structure comprising a layered material having an intermediate layer between the first plate and the second plate, the first plate forms the substrate of the load beam, the intermediate layer forms the sidewall of the recessed portion, and the second plate forms the bottom of the recessed portion.

7. The suspension according to claim 6, wherein the recessed portion has a bottom, the bottom has a dimple raised to the side on which the head slider is positioned, and wherein the flexure is supported in contact with the dimple.

8. The suspension according to claim 6, wherein the intermediate layer is formed of a resin.

9. The suspension according to claim 6, wherein the first plate and the second plate are stainless steel and the intermediate layer is polyimide resin.

* * * * *